(12) United States Patent
Freund et al.

(10) Patent No.: US 6,894,282 B2
(45) Date of Patent: May 17, 2005

(54) RADIATION DETECTOR HAVING A UNITARY REFLECTOR PART COMPOSED OF PLASTIC CONTAINING AN OPTICALLY REFLECTIVE FILLER

(75) Inventors: Andreas Freund, Heroldsbach (DE); Jürgen Leppert, Forchheim (DE)

(73) Assignee: Siemens Aktiengesellschaft, Münich (DE)

( * ) Notice: Subject to any disclaimer, the term of this patent is extended or adjusted under 35 U.S.C. 154(b) by 103 days.

(21) Appl. No.: 10/130,685

(22) PCT Filed: Sep. 14, 2001

(86) PCT No.: PCT/DE01/03545

§ 371 (c)(1),
(2), (4) Date: Sep. 30, 2002

(87) PCT Pub. No.: WO02/25311

PCT Pub. Date: Mar. 28, 2002

(65) Prior Publication Data

US 2003/0150994 A1 Aug. 14, 2003

(30) Foreign Application Priority Data

Sep. 19, 2000 (DE) .......................... 100 46 314

(51) Int. Cl.⁷ ................................. G01T 1/20
(52) U.S. Cl. ................. 250/368; 250/366; 250/367
(58) Field of Search ............... 250/368, 366, 250/367, 363.01, 363.03, 363.1, 370.01, 370.09, 270.11, 370.14; 348/307, 308

(56) References Cited

U.S. PATENT DOCUMENTS

| 5,153,438 | A | | 10/1992 | Kingsley et al. |
| 5,373,162 | A | | 12/1994 | Akai |
| 5,773,829 | A | * | 6/1998 | Iwanczyk et al. ........... 250/367 |
| 5,965,893 | A | | 10/1999 | Tonami et al. |
| 6,087,663 | A | * | 7/2000 | Moisan et al. ............. 250/367 |
| 6,091,795 | A | | 7/2000 | Schafer et al. |
| 6,252,231 | B1 | | 6/2001 | Harootian |
| 6,362,479 | B1 | * | 3/2002 | Andreaco et al. ........... 250/366 |
| 6,501,158 | B1 | * | 12/2002 | Fazelpour et al. .......... 257/670 |

FOREIGN PATENT DOCUMENTS

| DE | OS 38 27 976 | 2/1990 |
| DE | PS 196 43 644 | 4/1998 |

OTHER PUBLICATIONS

Patent Abstracts of Japan, Publication No. 63061178 A, for Japanese Application 61205086.

* cited by examiner

Primary Examiner—Otilia Gabor
(74) Attorney, Agent, or Firm—Schiff Hardin LLP

(57) ABSTRACT

A radiation detector has a photodiode arrangement, a number of scintillators, and a reflector part having a number of compartments corresponding to the number of scintillators, which receive the scintillators in such a way that the scintillators are surrounded by walls of the compartments with the exception of their side respectively facing the photodiode arrangement.

11 Claims, 3 Drawing Sheets

RADIATION DETECTOR HAVING A UNITARY REFLECTOR PART COMPOSED OF PLASTIC CONTAINING AN OPTICALLY REFLECTIVE FILLER

BACKGROUND OF THE INVENTION

1. Field of the Invention

The present invention relates to a radiation detector of the type having a number of scintillators which emit light when radiation to be detected is incident thereon, the light being detected by photodiodes of a photodiode arrangement.

2. Description of the Prior Art

Radiation detectors of the above type are used in computed tomography systems, for example. If X-ray quanta are incident on the scintillators, which are composed of a suitable luminescent material, for example luminescent ceramic, the X-ray quanta are converted into light quanta. The light quanta are converted by the photodiodes into an electric current corresponding to the intensity of the light, and this current is amplified by an electronic unit and converted into digital data which are processed to form X-ray images by means of a computer associated with the computer tomography system.

In order to obtain a maximum light yield on the photodiode, the scintillators, composed of an optically transparent or translucent luminescent material, are surrounded by an optically reflective material on all sides except on their side facing the photodiode arrangement.

The scintillators are usually provided with a scattered radiation collimator whose collimator plates are oriented to the focus of an X-ray source interacting with the radiation detector, so that essentially only X-ray radiation emerging from the X-ray source can pass to the scintillators, while the scattered radiation produced when carrying out an examination in the object under examination is for the most part kept away from the scintillators.

In a known radiation detector of modular construction for a computed tomography system, each module has a photodiode arrangement with a number of photodiodes which are each assigned a scintillator. In this case, the scintillators are not separate elements since this would make it more difficult, if not impossible, to effect the exact positioning of the scintillators relative to the photodiodes.

A scintillator part is used whose length and width have a certain oversize relative to the length and width of the photodiode arrangement.

This scintillator part is encapsulated at its periphery and top side with a reflector coating, e.g. epoxy resin filled with titanium oxide, which serves as an optical reflector. In this case, a defined layer thickness is ensured at the periphery by special casting molds. At the top side, a defined layer thickness is ensured by mechanical processing in a special apparatus.

Afterward, the scintillator part is positioned on the photodiode arrangement by means of a special apparatus and adhesively bonded to said arrangement, in which case the apparatus can be removed again only after the adhesive bonding has cured.

The elements thus produced are laterally trimmed by special high-precision abrasive cutting machines and the scintillator element is slotted in such a way that each photodiode of the photodiode arrangement is allocated to a scintillator. In this case, particular attention must be paid to the slot depth in order to avoid damage to the photodiodes.

So-called septa, for example aluminum foils coated on both sides, are adhesively bonded into the slots bounding the scintillators. The trimmed areas of the scintillator part are likewise bonded to septa.

Another manufacturing concept is based on adhesively bonding in each case a scintillator and a photodiode to one another and assembling a large number of such detector elements to form a radiation detector. It is possible in this case as well to combine a number of detector elements to form detector modules.

If it is intended to use a scattered radiation collimator, in both manufacturing concepts it is complicated and difficult to position the scattered radiation collimator before the adhesive bonding to the radiation detector or detector modules relative to the latter in the required manner. Therefore, complicated apparatuses are used in which the scattered radiation collimator and the radiation detector or the detector module must remain until the adhesive bonding has cured.

SUMMARY OF THE INVENTION

An object of the present invention is to provide a radiation detector of the type mentioned in the introduction which can be produced in a simple and uncomplicated manner.

The above object is achieved in accordance with the principles of the present invention in a radiation detector having a photodiode arrangement with a number of scintillators and an optically reflective part having a number of compartments therein equal to the number of scintillators, with the scintillators being respectively received in the compartments, so that each scintillator is surrounded by the walls of the compartment except for a side of the scintillator that faces toward the photodiode arrangement.

In the case of the invention, thus, the reflector part not only renders superfluous the septa required in the prior art as well as the coating with reflector coating, but additionally ensures that the scintillators assume defined positions relative to one another and relative to the photodiodes of the photodiode arrangement.

Consequently, the processing of the scintillators is restricted to tailoring them to the dimensions corresponding to the compartments in order that they can be inserted into the compartments of the reflector part, where they are fixed by adhesive bonding in accordance with one variant of the invention. As already mentioned, then, potting with reflector coating is not necessary, with the result that the expensive casting molds required for this can be obviated. Moreover, there is no need for expensive special machines for processing the scintillators.

Furthermore, the slotting operations required in the prior art and the associated risk of damaging photodiodes of the photodiode arrangement are obviated. Finally, as mentioned, septa are not required, which renders superfluous the production and handling of these sensitive additional parts.

Thus the radiation detector according to the invention can be produced in a significantly simpler, less complicated and thus more cost-effective manner than in the prior art.

In a preferred embodiment of the invention, the reflector part is of one-part design, i.e., unitary or seamless, for example as an injection-molded or die-cast part, which is preferably produced from plastic, in particular a plastic containing an optically reflective filler. By virtue of such a design of the reflector part, the latter and thus the radiation detector overall can be produced in a simpler and more cost-effective manner.

In a further preferred embodiment of the invention the reflector part and the photodiode arrangement have centering means which interact with one another and which, in the case of the arrangement of the reflector part in front of the photodiode arrangement, ensure that the scintillators are arranged opposite the respectively associated photodiode. This measure further simplifies the production of the radiation detector according to the invention, since no complicated measures or apparatuses are required for ensuring the required defined position of reflector part and photodiode arrangement relative to one another.

In a further embodiment of the invention, the radiation detector has a scattered radiation collimator with collimator plates which is arranged in front of the reflector part. The reflector part and the scattered radiation collimator have centering means which interact with one another and which, in the case of the arrangement of the scattered radiation collimator in front of the reflector part, ensure that the collimator plates of the scattered radiation collimator are aligned with walls of the reflector part which surrounds the compartments. This measure ensures, in a simple manner, in particular without complicated apparatuses, that the scattered radiation collimator and the reflector part are positioned correctly relative to one another.

In another embodiment of the invention the radiation detector is composed of a number of modules, each of which has a reflector part with scintillators and a photodiode arrangement, in which case each module can be allocated to a scattered radiation collimator.

DESCRIPTION OF THE PREFERRED EMBODIMENTS

Figure 1:
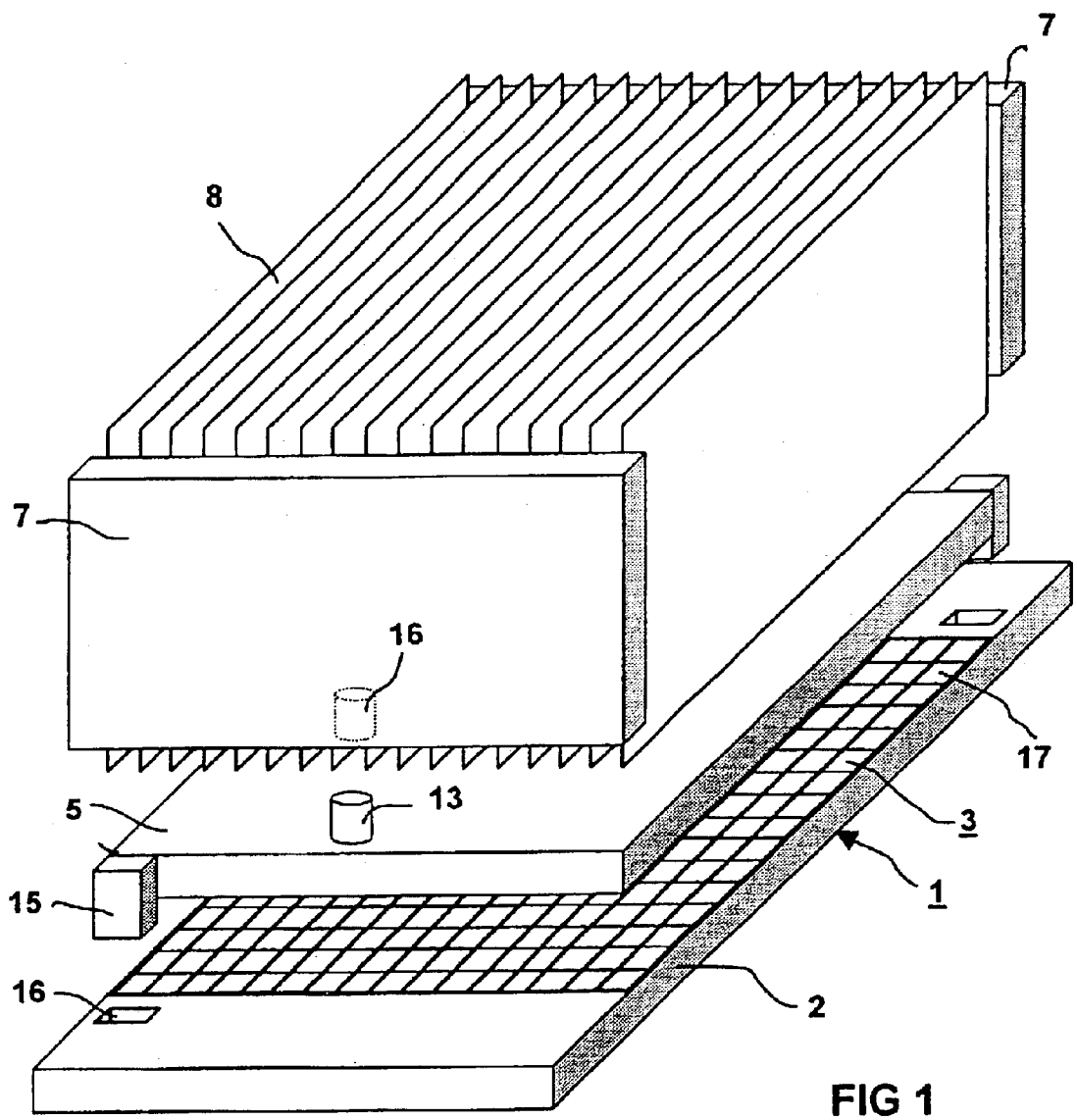
FIG. 1 is a perspective, exploded view of a radiation detector constructed in accordance with the principles of the present invention
Figure 2:
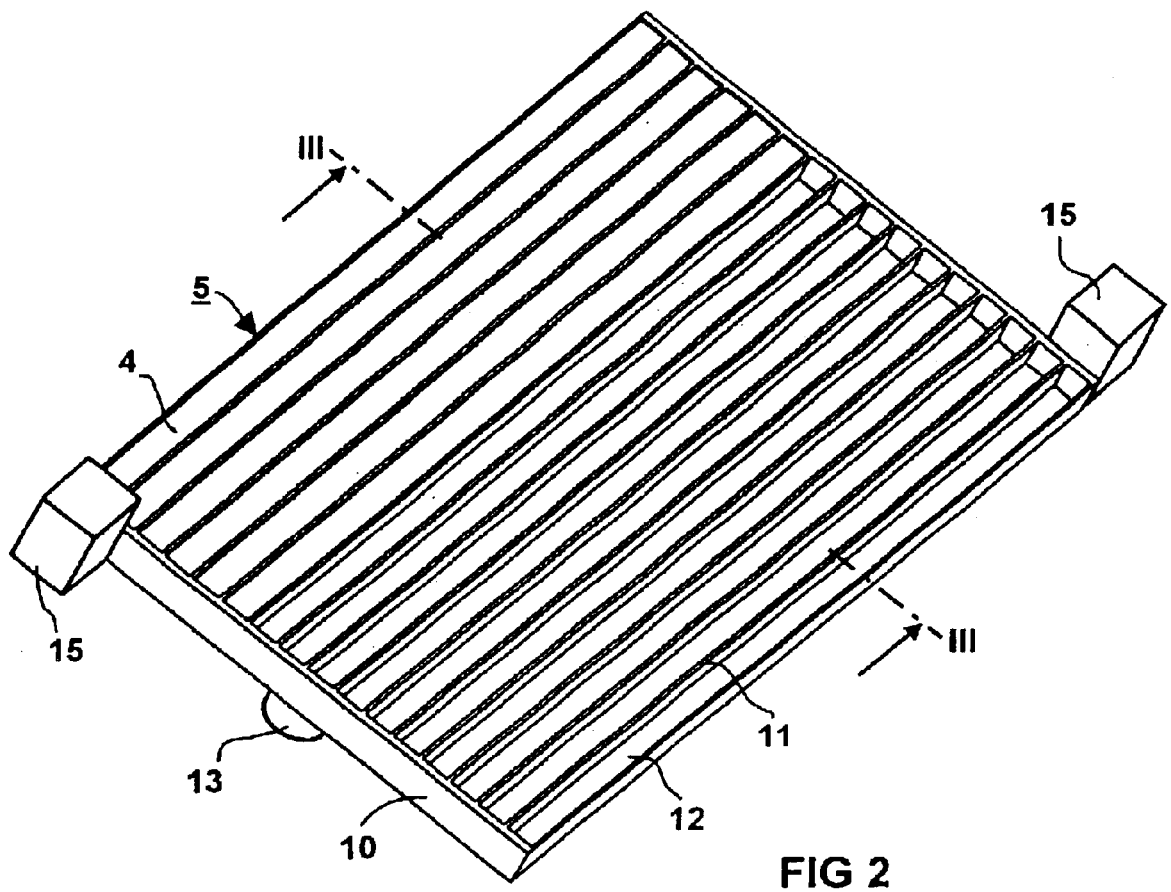
FIG. 2 is a perspective view of the reflector part of the radiation detector of FIG. 1.
Figure 3:
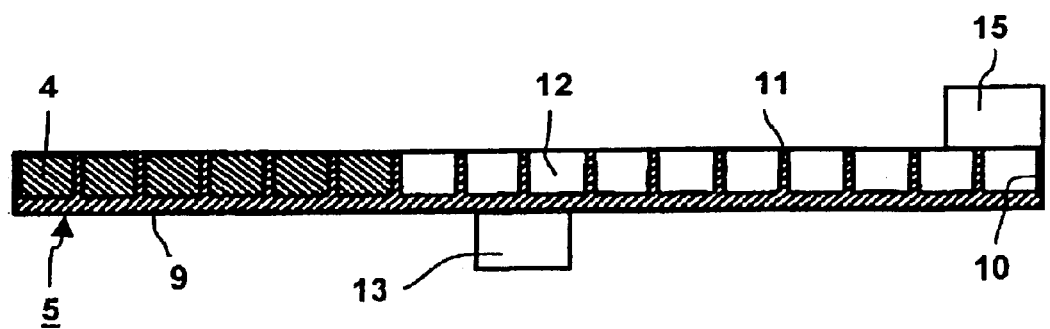
FIG. 3 is a sectional view taken along line III—III of FIG. 2.

As can be seen in FIG. 1, the exemplary embodiment of a radiation detector according to the invention which is illustrated in FIGS. 1 to 3 has, as essential elements, a photodiode arrangement 1 with photodiodes 3 fitted on a substrate 2, a reflector part 5 containing scintillators 4 and a scattered radiation collimator 6 with collimator plates 8 fitted between two side parts 7.

As can be seen from FIG. 2 in conjunction with FIG. 3, the reflector part 5 has a base plate 9, on which a frame-shaped boundary wall 10 is fitted.

The space surrounded by the boundary wall 10 is subdivided into a number of compartments, one of which is provided with the reference symbol 12, by partitions 11 running parallel to one another and parallel to two mutually opposite sections of the boundary wall 10.

The compartments 12 each receive a rod-shaped scintillator 4 which is adhesively bonded into the respective compartment 12.

The dimensions of the scintillators 4 are coordinated with the compartments in such a way that said scintillators completely fill said compartments.

In the case of FIGS. 2 and 3, only some of the compartments 12 contain scintillators 4, in order to be able to illustrate the configuration of the compartments 12. It is understood, however, that all the compartments 12 of the reflector part 5 contain scintillators 4 in the assembled state.

Thus the individual scintillators 4, except at their side facing the photodiode arrangement 1, are surrounded by walls of the reflector part 5, whether by the base plate 9, or by the boundary wall 10 or by the partitions 11.

Since the reflector part 5, which is designed as an injection-molded or die-cast part, is formed from an optically reflective material, from epoxy resin treated with titanium oxide in the case of the exemplary embodiment described, the reflector part 5 takes over the functions which are performed by the septa and the covering with reflector coating in the case of the prior art.

The reflector part 5 containing the scintillators 4 and the photodiode arrangement 1 are joined together to form a unit, which can be done by adhesive bonding, for example to assure that the joined components assume a defined position relative to one another in which the free sides of the scintillators 4, which face the photodiode arrangement 1, are arranged opposite the photodiode of the photodiode arrangement 1 which is allocated to the respective scintillator 4, so that the active areas of the photodiodes are congruent with the free sides of the scintillators 4, the photodiode arrangement and the reflector part 5 are provided with centering means which interact with one another.

In the exemplary embodiment, these centering means are pins 13 which are fitted at the edge of the reflector part 5 and engage in corresponding openings 14 of the photodiode arrangement 1.

In order also to ensure a correct position of the scattered radiation collimator 6 relative to the reflector part 5 with the scintillators, the reflector part 5 and the scattered radiation collimator 6 are also provided with centering means which interact with one another, pins 15 fitted on the scattered radiation collimator 6 being involved which interact with openings 16 provided on the reflector part 5 and ensure that the collimator plates 8 of the scattered radiation collimator 6 are aligned with the partitions 11 of the reflector part 5.

Figure 4:
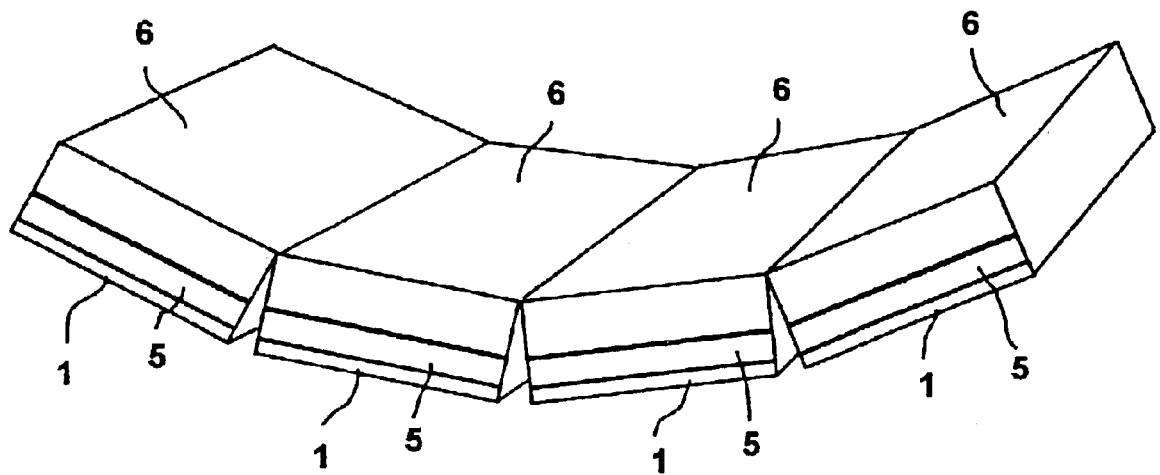
FIG. 4 illustrates a modularly constructed radiation detector in accordance with the invention.

As can be seen from FIG. 4, it is possible for a radiation detector according to the invention to be composed of a number of modules, each of which has a reflector part with scintillators, a photodiode arrangement and, if required, a scattered radiation collimator. Such a subdivision into modules affords the advantage, for example, that the individual modules are easy to handle.

In the exemplary embodiments the rectangular photodiodes 3 are subdivided into, for example, square photodiode segments 17. Such a subdivision may be expedient, but is not absolutely necessary.

The construction of the centering means described in connection with the exemplary embodiments is only an example. The centering means can be embodied differently.

Figure 5:
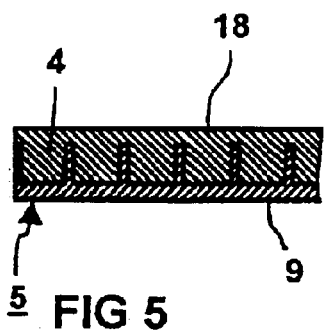
FIGS. 5 and 6 are sectional views illustrating an embodiment for the manufacture of the radiation detector according to the invention.
Figure 6:
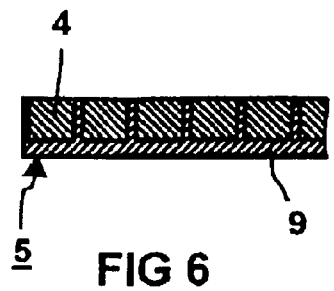

As an alternative to the procedure provided in the exemplary embodiment in accordance with FIGS. 1 to 3, namely of adhesively bonding separate rod-shaped scintillators 4 into the compartments 12 of the reflector part 5, it also is within the scope of the invention, in accordance with FIGS. 5 and 6, to first produce a scintillator blank 18 from a plate of scintillator material by the plate being structured by slots so that the scintillator blank 18 has a relatively thin base plate 19 with rod-shaped scintillators 4 situated thereon and configured to be a negative of the reflector part 5. This scintillator blank 18 is inserted into the reflector part 5 in such a way that a scintillator 4 is situated in each of the compartments 12, and is adhesively bonded to the reflector part 5 in such a way that there is an adhesive bond between each of the scintillators 4 situated on the base plate 19 and the respectively corresponding compartment 12 of the reflector part 5. After adhesive bonding has been effected, the base plate 19 is removed by material-removing machining, e.g. grinding, so that all that remains of the scintillator blank 18 are the scintillators 4 adhesively bonded to the compartments 12 of the reflector part 5.

The radiation detector according to the invention in accordance with the exemplary embodiments is provided for computed tomography. However, radiation detectors according to the invention can be used in general X-ray technology and also for the detection of ionizing radiation whose wavelength range lies outside the length range characteristic of X-ray radiation.

Although modifications and changes may be suggested by those skilled in the art, it is the invention of the inventors to embody within the patent warranted heron all changes and modifications as reasonably and properly come within the scope of their contribution to the art.

We claim:

1. A radiation detector comprising:

a plurality of scintillators which emit light when penetrating radiation is incident thereon;

a photodiode arrangement comprising a plurality of photodiodes disposed to detect light emitted by said plurality of scintillators, each of said scintillators in said plurality of scintillators having a side facing said photodiode arrangement; and a reflector part, formed separately as a one-piece unit composed of plastic, said plastic containing an optimally reflective filler, said reflector part reflecting said light and having a plurality of compartments equal to said plurality of scintillators, said scintillators in said plurality of said scintillators being respectively disposed in said compartments and, in said compartments, being surrounded by walls of said compartments on all sides except said side facing said photodiode arrangement.

2. A radiation detector as claimed in claim 1 wherein said reflector part and said compartments of said reflector part are disposed relative to said photodiode arrangement so that one scintillator in said plurality of scintillators is disposed opposite one photodiode of said photodiode arrangement.

3. A radiation detector as claimed in claim 1 comprising adhesive bonding fixing the respective scintillators in said compartments.

4. A radiation detector as claimed in claim 1 wherein said reflector part is seamless.

5. A radiation detector as claimed in claim 1 wherein said reflector part is an injection-molded part.

6. A radiation detector as claimed in claim 1 wherein said reflector part is a die-cast part.

7. A radiation detector as claimed in claim 1 further comprising centering elements disposed on said reflector part and said photodiode arrangement which interact with each other to maintain said scintillators in said plurality of scintillators at respective positions relative to said photodiodes in said photodiode arrangement.

8. A radiation detector as claimed in claim 1 further comprising a scattered radiation collimator having collimator plates disposed in front of said reflector part.

9. A radiation detector as claimed in claim 8 wherein said reflector part and said scattered radiation collimator have respective centering elements which interact with each other to maintain said collimator plates of said scattered radiation collimator aligned with said walls of said reflector part which form said compartments in which the respective scintillators are disposed.

10. A radiation detector as claimed in claim 1 wherein said plurality of scintillators, said photodiode arrangement and said reflector part comprise a first module, and wherein said radiation detector comprises a plurality of additional modules, identical to said first module, disposed adjacent to each other.

11. A radiation detector as claimed in claim 10 further comprising a plurality of scattered radiation collimators respectively disposed in front of each of said first module and said plurality of additional modules.

* * * * *